Oct. 22, 1963 A. W. BLACKMAN, JR 3,108,054
NUCLEAR POWERED PROPULSIVE DEVICE
Filed June 15, 1960

INVENTOR
ARTHUR W. BLACKMAN, JR.
BY Leonard F. Wekelund
ATTORNEY

3,108,054
NUCLEAR POWERED PROPULSIVE DEVICE

Arthur W. Blackman, Jr., Manchester, Conn., assignor to United Aircraft Corporation, East Hartford, Conn., a corporation of Delaware
Filed June 15, 1960, Ser. No. 36,353
2 Claims. (Cl. 204—193.2)

This invention relates to propulsion devices and more particularly to means for increasing the efficiency of rocket-type power plants.

It is an object of this invention to provide a rocket-type power plant and especially nuclear powered devices of this type having relatively high performance and efficiency.

The size of nuclear reactors is governed by the criticality considerations of the fissioning material and the power output, which in turn is a function of the reactor heat transfer rate. In rocket motor applications where thrust is obtained by reactors heating a relatively low molecular weight propellant, the reactor size is practically always determined from heat transfer considerations. It is known that the reactor size is a function of the reactor heat transfer coefficient, so that the higher the coefficient, the lower the over-all weight. Comparisons have been made in weight and performance of a representative nuclear reactor with that of an advanced chemical rocket for a selected mission and a particular payload and burn-out velocity. It was found, for example, that the nuclear rocket had a gross weight of 1.58 times that of the chemical rocket, and the reactor and nozzle weight of the nuclear rocket was 13.5 times as heavy as in the case of the chemical rocket. It has been determined that by merely increasing the reactor heat transfer coefficient by a factor of two over that normally encountered, the reactor's weight could be reduced by over 20 percent, thus this saving could be added to the propellant weight for a given design. Such an increase in efficiency may produce a range increase of almost 25 percent. Therefore, it is readily apparent that the reactor heat transfer coefficient is a relatively sensitive function of performance of such power plants.

It is therefore, a primary object of this invention to provide a nuclear-type rocket power plant having a controlled oscillating flow of the fluid propellant which is being heated in the reactor chamber. The present invention can be compared in principle to the screeching combustion that is encountered in ordinary combustion chambers where heat transfer coefficients are increased by a factor of two or more.

Figure 1:
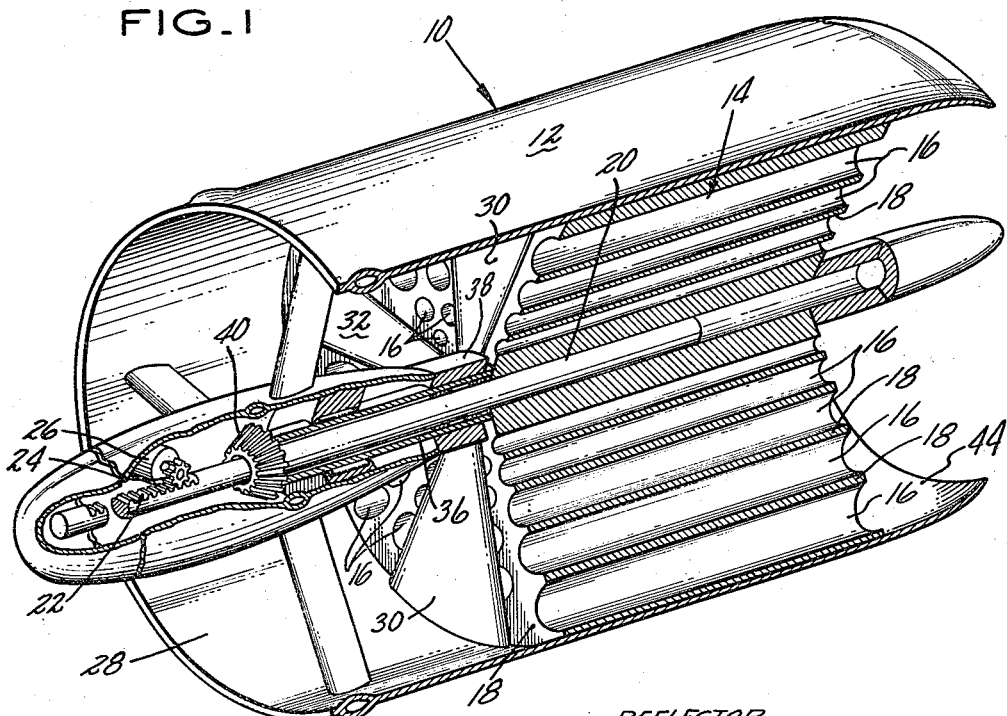
Figure 2:
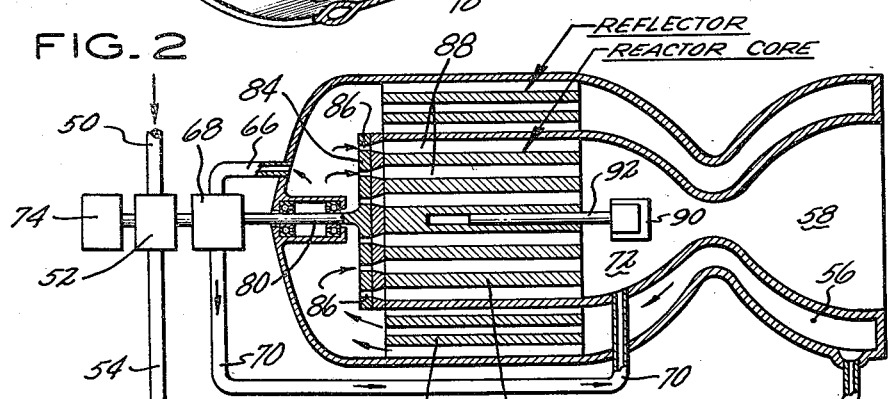
Figure 3:
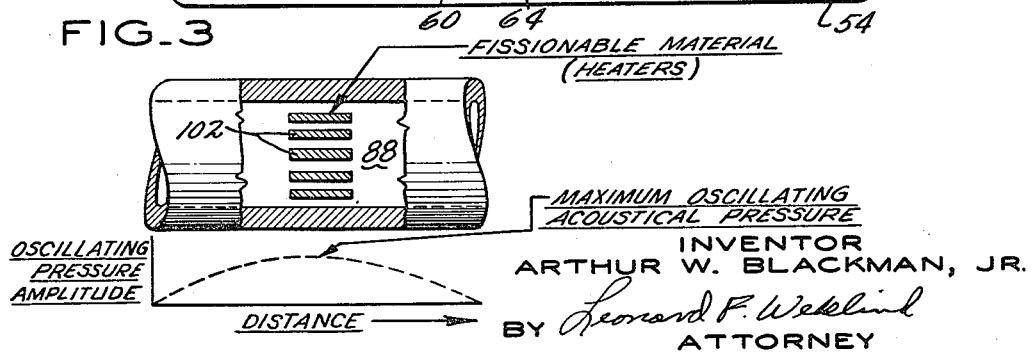

These and other objectives of this invetnion will become readily apparent from the following detailed description of the drawing in which, FIG. 1 is a perspective view in partial cross section of a typical nuclear rocket power plant having a mechanically excited pulsating mechanism;

FIG. 2 is a schematic in partial cross section of a typical nuclear rocket system; and FIG. 3 is a schematic in partial cross section of a modification of the pulsating mechanism requiring no moving parts.

Referring to FIG. 1, a typical power plant is indicated at 10 as having an outer casing 12 which surrounds a nuclear reactor generally indicated at 14. The nuclear rocket comprises a core having a plurality of fluid passages 16 formed in a body of material 18 comprising a matrix of fissioning material suitably embedded in a moderating material which slows down (by elastic collision) the fast neutrons given off by the fission reaction. The control of the fissioning material is provided by means of a control rod 20 which can be moved back and forth through the center of the core by means of a rack 22 and a pinion 24 moved by a suitable motor 26. The propulsion fluid of any suitable type enters the inlet 28 and is intended to pass through the passage 16 in the core of the nuclear reactor 14. To increase the efficiency of the heat transfer to the propulsion fluid, a plurality of vanes 30, 32 are mounted in the upstream end of the core for intermittently blocking the flow through the passage 16 at some predetermined frequency. The vanes 30, 32 act like a siren as they are rotated about the hollow shaft 36. The vanes 30, 32 are carried by a sleeve 38 which surrounds the hollow shaft 36 and the center control rod 20 and may be driven by any suitable means at a predetermined speed through the bevel gear 40.

The pulsations thus produced in the passages 16 of the nuclear reactor will increase the heat transfer coefficient within the reactor so that hot fluids will eventually be emitted through the exhaust nozzle 44.

FIG. 2 shows a typical system utilizing, for example, hydrogen as a propellant. The hydrogen may be introduced in liquid state from a suitable source to the inlet 50 which leads to a suitable pump 52 leading to a feed line 54. The liquid hydrogen passes into an annular jacket 56 for cooling the rocket nozzle 58.

The hydrogen then passes through the reflector 60 to cool the latter since it will tend to be heated as it acts to reflect escaping neutrons back into the reactor core 64. Some of the propellant is conducted via the line 66 to a turbine 68 which drives the pump 52. The exhaust flow of expanded propellant from the pump 52 flows via the passage 70 into the upstream end 72 of the exhaust nozzle. An auxiliary power unit 74 may be provided adjacent the pump 52 to produce power for other requirements. The turbine 68 drives a shaft 80 which rotates a disc 84 having a plurality of passages 86 indexed with the reactor passages 88. This provides a siren effect to thereby pulsate the flow in the passages 88 of the reactor core to increase the efficiency of the heat transfer. A control 90 may be provided to move the control rod 92 in and out of the nuclear reactor core to vary its output.

FIG. 3 is a very simple illustration of one of the reactor passages 88 wherein the resonant pulsations in the passage may be controlled by the introduction of strategically located localized heat elements 102. These heat elements 102 are shown in the form of plates but may assume any suitable form. Thus, the plates 102 may be specifically positioned nuclear rocket materials which will provide the desired heat at the particular location. The plates 102 are constructed similar to the reactor core passages 88—they are heated by the fissioning material therein. It is known that in a passage having a flow of fluid therethrough, that the localized heat at a particular point in the tube can drive the fluid into a pulsating state, and in turn produce resonance in the tube. Such resonances occur when a varying heat supply is produced such that a maximum in the heat supply occurs very nearly in phase with a maximum in the oscillating pressure. Hence, the localized heat source should be positioned close to the region of maximum oscillating pressure as illustrated in FIG. 3. Design parameters of heterogeneous reactor core elements can be found in standard texts such as:

Glasstone, S., and M. C. Edlund: "The Elements of Nuclear Reactor Theory," published in 1952 by D. Van Nostrand Co., Inc.

Glasstone, S.: "Principles of Nuclear Reactor Engineering," published in 1955 by D. Van Nostrand Co., Inc.

It can be seen that a nuclear rocket propulsion device has been provided having a relatively high heat transfer coefficient as a result of producing pulsating flow in the reactor core by means of mechanically induced pulsations or as a result of automatically induced pulsations by means of a localized heat source.

Although several embodiments of this invention have been illustrated and described, it will be apparent that various changes may be made in the construction and arrangement of the various parts without departing from the scope of this novel concept.

What is desired by Letters Patent is:

1. A propulsive device having a heat-adding chamber, nuclear reactor core means located in said chamber, said core member comprising a matrix of fissioning material dispersed in a moderating material, a plurality of first fluid passages in said core extending parallel to the longitudinal axes of said chamber, a neutron reflector surrounding said core member, control means for regulating the output of said core, a casing surrounding said reflector and defining an upstream inlet chamber for said core, an exhaust nozzle adjacent the downstream end of said casing receiving propulsive fluid from said core, a source of high energy fluid propellant, means for pumping fluid propellant from said source to said chamber and through said first passages for heating said propellant, and means for inducing pulsations in the flow in said first passages to cause a resonance therein comprising a secondary localized heat source in said first passages for increasing the heat transfer coefficient of said core relative to said fluid propellant.

2. A propulsive device having a heat-adding chamber, nuclear reactor core means located in said chamber, said core member comprising a matrix of fissioning material dispersed in a moderating material, a plurality of first fluid passages in said core extending parallel to the longitudinal axes of said chamber, a neutron reflector surrounding said core member including a plurality of elongated second fluid passages therein, control means for regulating the energy output of said core, a casing surrounding said reflector and defining an upstream inlet chamber for said core, an exhaust nozzle adjacent the downstream end of said casing receiving propulsive fluid from said core, a coolant jacket surrounding said nozzle and communicating with said second passages, said second passages communicating with said chamber, a source of high energy fluid propellant, means for pumping fluid propellant from said source to said jacket for subsequent passage through said second passages and into said chamber and said first passages, and means for pulsating the flow in said first passages and regulating the heat transfer coefficient of said core relative to said propellant including a second localized heat source means in said passages intermediate said chamber and said nozzle, said second heat source adding heat adjacent the area of maximum oscillating acoustical pressure.

References Cited in the file of this patent

UNITED STATES PATENTS

| | | |
|---|---|---|
| 2,722,180 | McIlwaine | Nov. 1, 1955 |
| 2,748,753 | Sarrazin et al. | June 5, 1956 |
| 2,869,624 | Walper et al. | Jan. 20, 1959 |

FOREIGN PATENTS

| | | |
|---|---|---|
| 754,559 | Great Britain | Aug. 8, 1956 |
| 798,617 | Great Britain | July 23, 1958 |

OTHER REFERENCES

Nucleonics, July 1958, pp. 62–68.

Nuclear Rocket Propulsion, by R. W. Bussard et al., McGraw-Hill Book Co., N.Y., 1958, pp. 190, 191, 192, 193, 218, 220, 221, 244, 245, 246, 247.